United States Patent [19]
Niemi et al.

[11] Patent Number: 5,967,392
[45] Date of Patent: Oct. 19, 1999

[54] CARGO BED UTILITY BOX

[75] Inventors: Karl A. Niemi, Waunakee; Patrick J. Quigley, Portage, both of Wis.

[73] Assignee: Penda Corporation, Portage, Wis.

[21] Appl. No.: 08/837,691

[22] Filed: Apr. 22, 1997

[51] Int. Cl.$^6$ .............................. B60R 9/00; B65D 43/24; B65D 53/00; E05F 1/12
[52] U.S. Cl. .......................... 224/404; 220/324; 220/643; 220/827; 220/831; 220/844; 16/289
[58] Field of Search .................................... 224/404, 328; 220/324, 643, 654, 648, 827, 831, 832, 833, 836, 843, 844; 16/286, 289, 290; 296/37.6

[56] References Cited

U.S. PATENT DOCUMENTS

| | | | |
|---|---|---|---|
| D. 274,139 | 6/1984 | Suffern et al. | D12/157 |
| D. 275,275 | 8/1984 | Stapp | D12/157 |
| D. 294,816 | 3/1988 | Hoyt | D12/157 |
| D. 300,019 | 2/1989 | Dickinson | D12/157 |
| D. 303,780 | 10/1989 | Sauber | D12/157 |
| D. 305,315 | 1/1990 | Fletcher | D12/157 |
| D. 324,197 | 2/1992 | Dickinson | D12/157 |
| D. 349,091 | 7/1994 | Dickinson | D12/406 |
| 3,727,971 | 4/1973 | Sisler | 296/37 |
| 3,858,752 | 1/1975 | Marvin, Jr. et al. | 220/643 |
| 3,902,220 | 9/1975 | Little | 16/145 |
| 3,940,009 | 2/1976 | Szeles | 220/20 |
| 4,085,961 | 4/1978 | Brown | 296/37.6 |
| 4,179,153 | 12/1979 | Cole, Jr. | 296/37.1 |
| 4,249,295 | 2/1981 | Lance | 29/416 |
| 4,288,011 | 9/1981 | Grossman | 224/42.42 |
| 4,312,097 | 1/1982 | Boyd | 16/289 |
| 4,469,364 | 9/1984 | Rafi-Zadeh | 296/37.6 |
| 4,488,669 | 12/1984 | Waters | 224/273 |
| 4,531,774 | 7/1985 | Whatley | 296/37.6 |
| 4,543,798 | 10/1985 | Page | 62/239 |
| 4,580,827 | 4/1986 | Feagan | 296/37.6 |
| 4,635,992 | 1/1987 | Hamilton et al. | 296/37.6 |
| 4,674,665 | 6/1987 | Van Kirk | 224/273 |
| 4,705,317 | 11/1987 | Henri | 296/37.6 |
| 4,728,017 | 3/1988 | Mullican | 224/42.42 |
| 4,741,441 | 5/1988 | Keffeler | 206/532 |
| 4,789,195 | 12/1988 | Fletcher | 296/37.6 |
| 4,844,305 | 7/1989 | McNeely | 224/42.42 |
| 4,848,626 | 7/1989 | Waters | 224/273 |
| 4,850,519 | 7/1989 | Farmer, Jr. | 224/42.42 |
| 4,899,420 | 2/1990 | Bye et al. | 16/289 |
| 4,944,544 | 7/1990 | Dick | 296/37.1 |
| 4,946,215 | 8/1990 | Taylor | 296/37.6 |
| 4,967,944 | 11/1990 | Waters | 224/273 |
| 4,998,425 | 3/1991 | Hoogland | 70/159 |
| 5,052,737 | 10/1991 | Farmer, Jr. | 296/39.2 |
| 5,080,250 | 1/1992 | Dickinson et al. | 220/335 |
| 5,094,375 | 3/1992 | Wright | 224/42.42 |
| 5,121,306 | 6/1992 | Palmisano | 362/80 |
| 5,183,307 | 2/1993 | Chiu, Jr. | 296/24.1 |
| 5,188,414 | 2/1993 | Burnham et al. | 296/37.6 |
| 5,207,490 | 5/1993 | Kaspar et al. | 16/DIG. 17 |
| 5,235,830 | 8/1993 | Benge | 70/56 |
| 5,303,969 | 4/1994 | Simnacher | 296/37.6 |
| 5,441,707 | 8/1995 | Lewis et al. | 422/300 |
| 5,484,092 | 1/1996 | Cheney | 224/404 |
| 5,601,206 | 2/1997 | Haas et al. | 224/404 |

*Primary Examiner*—Linda J. Sholl
*Attorney, Agent, or Firm*—Lathrop & Clark LLP

[57] ABSTRACT

A truck cargo bed utility box blow molded of high density polyethylene which complements the styling of many truck bedliners. The utility box incorporates a mounting system for a central pneumatic spring which holds the lid of the box open. The mounting system consists of a bracket mounted to a wall forming part of the storage bin and a bracket on the bin lid. The lid bracket and the bin bracket extend to and engage with a hinge pin which joins the lid to the storage bin. The brackets are constructed of sheet metal and are mechanically joined by the hinge pin. The loads imposed on the lid and bin wall by the air spring are distributed through the hinge pin. The bin bracket is also attached to a metal rim which surrounds the opening into the box to provide load distribution. The metal rim provides a distortion resistant structure to which locking hasps can reliably latch. By distributing the loads imposed on the plastic lid and plastic bin distortion of the plastic is prevented.

18 Claims, 3 Drawing Sheets

CARGO BED UTILITY BOX

FIELD OF THE INVENTION

The present invention relates to truck utility boxes and storage containers which fit within the bed of a pickup truck.

BACKGROUND OF THE INVENTION

Pickup trucks are designed for the transportation of cargo. They are often owned by tradesmen such as construction workers, plumbers, electricians, and farmers. These truck owners not only transport equipment to a job site but typically work with or install what they transport. In such applications a pickup truck is used not only as a means of transporting material, but also as a mobile shop, in which use the truck is required to store tools and small hardware items like screws, nails and fittings.

Cargo bed utility boxes have been developed for this purpose. Boxes have been manufactured of sheet metal, fiberglass and plastic of various types. Although a cargo bed utility box should meet basic functional requirements such as keeping the contents dry, organized and securely attached to the truck box, for many purchasers the appearance of the box is also important. For the tradesman the appearance of a vehicle may reflect on a reputation for neat high quality work.

Another type of pickup truck owner utilizes the truck for personal transportation during the week and utilizes cargo transporting capability for a second job or hobby on nights or on weekends. This type of pickup truck owner is inclined to apply the appearance standards of cars to a pickup truck, further highlighting the importance of the appearance of any accessory used with a truck.

Both types of pickup truck owners typically purchase a thermoplastic thermoformed bedliner either with the truck or as an aftermarket accessory. Bedliners protect the truck from scraping and wear from cargo carried in the truck. They also can prevent cargo items from sliding around within the cargo box.

Truck utility boxes are sometimes constructed of plastic. Plastic in addition to being readily formed to meet stylistic requirements has many advantages. It does not rust or corrode, it is lightweight, and can be fabricated into complex shapes at reasonable costs. In addition, plastic resists denting, does not require painting, and is not prone to damaging the truck box or truck box liner. Nevertheless, plastic has one disadvantage: its lower strength compared with other materials can lead to distortion where loads are concentrated. This is particularly a problem in attaching a lid support system and in developing a reliable latching system.

What is needed is a system for avoiding concentrated loads and the distortion which such loading can cause in plastic truck utility boxes.

SUMMARY OF THE INVENTION

The truck cargo bed utility box of this invention is blow molded of high density polyethylene which can complement the style of many truck bed liners which are formed from similar material. The utility box of this invention incorporates design solutions which provide durability and long life by incorporating a mounting system for a central pneumatic spring which holds the lid of the box open. The mounting system consists of a bracket mounted to the wall forming part of the storage bin and a bracket on the bin lid. The lid bracket and the bin bracket extend to and engage with a hinge pin which joins the lid to the storage bin. Because the brackets are constructed of sheet metal and are mechanically joined by the hinge pin, the loads imposed on the lid and bin wall by the air spring is distributed through the hinge pin. The bin bracket is also attached to a metal rim which surrounds the opening into the box. The metal rim supplies stiffness and load distribution. By distributing the loads imposed on the plastic lid and plastic bin, distortion of the plastic is prevented because the induced loads on the plastic are reduced.

It is an object of the present invention to provide a cargo bed utility box which is constructed of plastic and designed for long life.

It is another object of the present invention to provide a cargo bed utility box which incorporates a pneumatic spring lid support.

It is a further object of the present invention to provide a plastic cargo bed utility box which has a lid support bracket which distributes the load from a support spring thus preventing distortion of the plastic making up the utility box.

It is a yet further object of the present venture to provide a plastic truck bed utility box with a lid which reliably latches.

Further objects, features and advantages of the invention will be apparent from the following detailed description when taken in conjunction with the accompanying drawings.

DESCRIPTION OF THE PREFERRED EMBODIMENT

Figure 1:
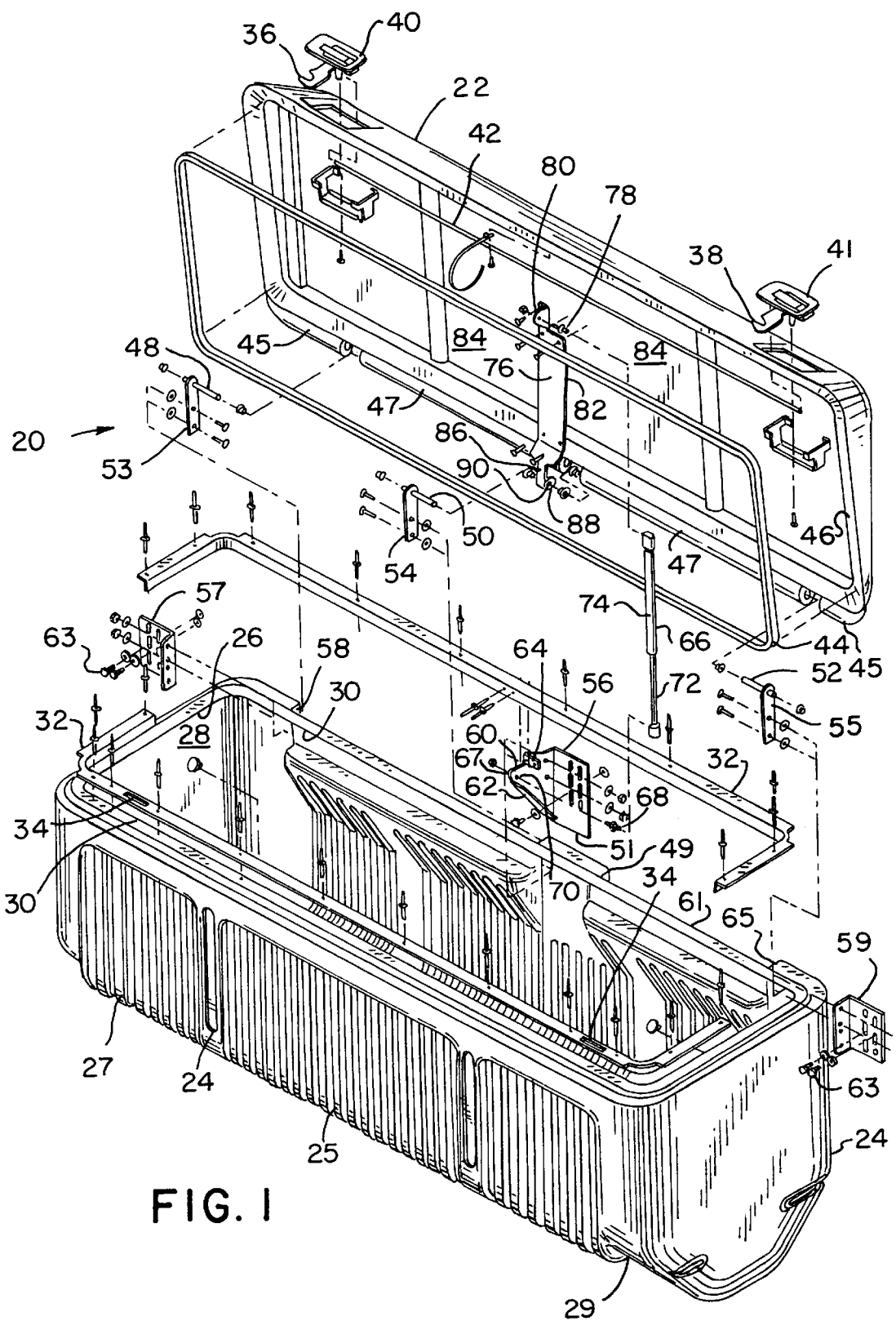
FIG. 1 is an exploded isometric view of the cargo bed utility box of this invention.
Figure 2:
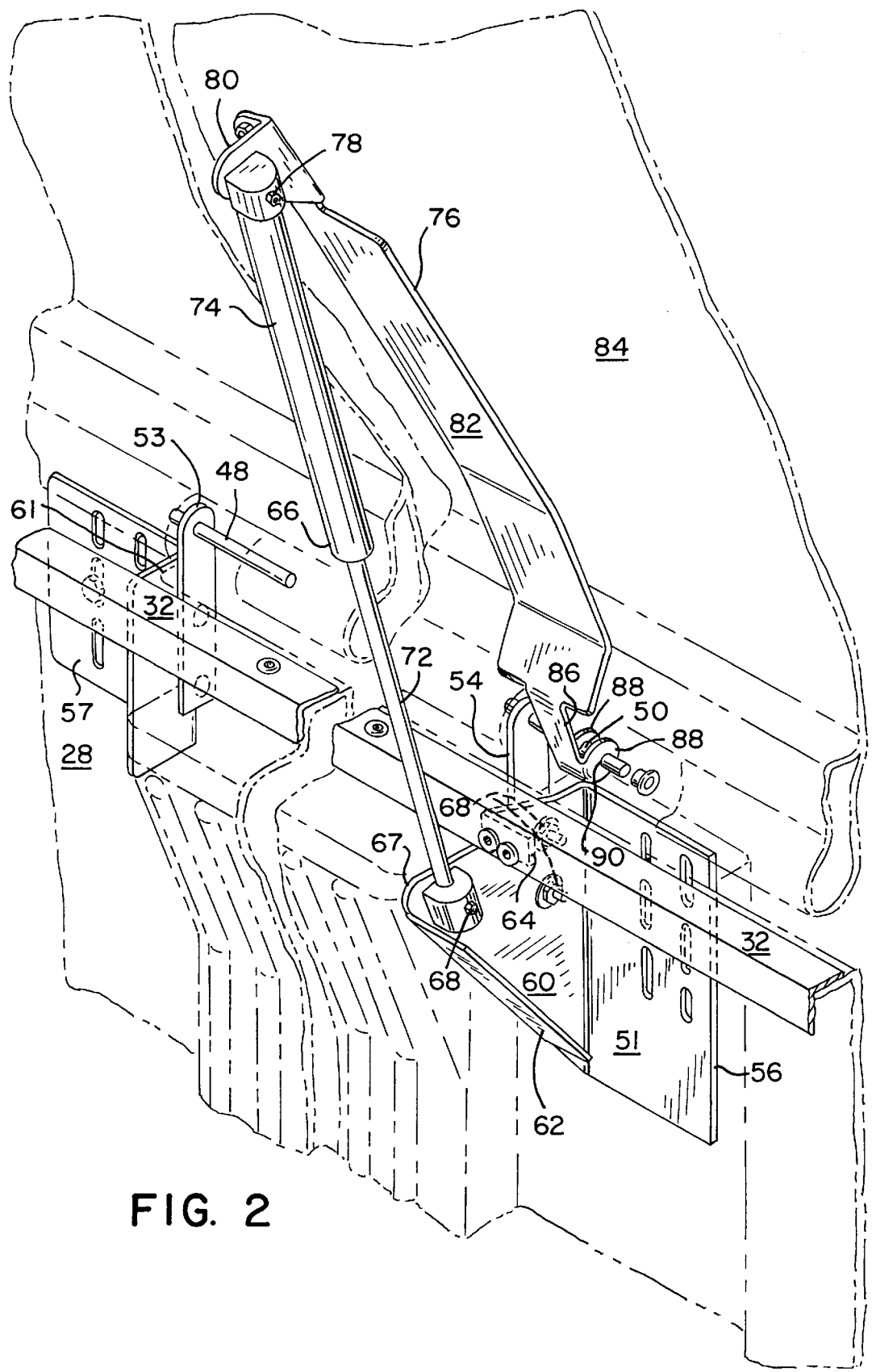
FIG. 2 is a fragmentary isometric view of the pneumatic lid support spring and the attachment brackets for mounting the support spring between the lid and the cargo bin of FIG. 1.
Figure 3:
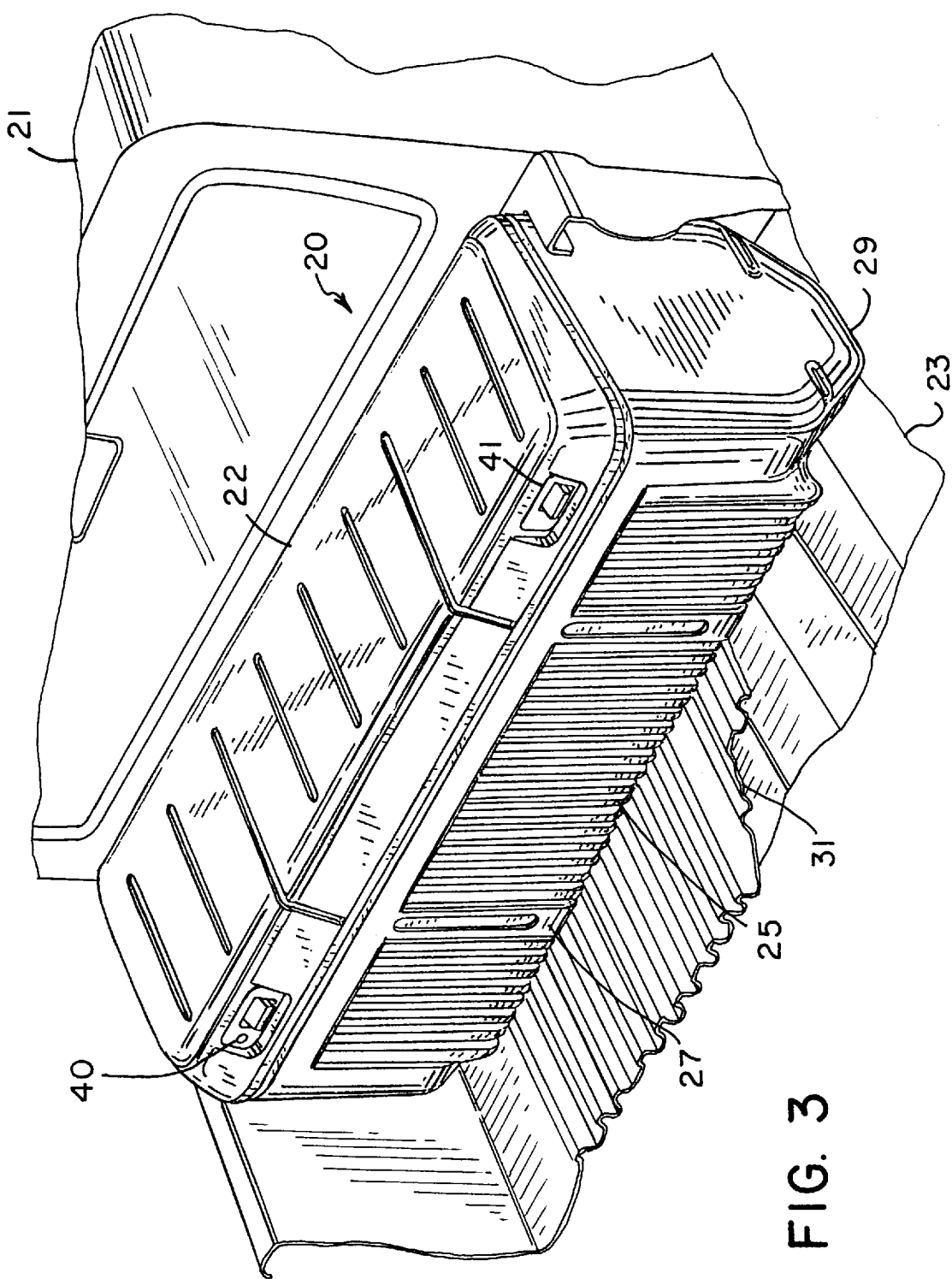
FIG. 3 is an isometric view of the assembled cargo bed utility box of FIG. 1 mounted to a bedliner in a truck bed.

Referring more particularly to FIGS. 1–3, wherein like numbers refer to similar parts, a cargo bed utility box 20 is shown in FIGS. 1 and 3. The utility box 20 is used in a pickup truck 21 cargo bed 23. The utility box 20 is preferably installed on top of a thermoplastic bedliner 31. The utility box 20 is blow molded as two separate parts: a lid 22 and a storage bin 24. The storage bin 24 has an opening 26 which is cut in the blow molded part to allow access to the interior 28 of the bin 24. The plastic bin 24 defining a storage compartment having a front wall 27, a rear wall 58, a bottom wall 29, and two end walls.

The plastic construction of the utility box 20 permits the economical provision of various surface structure details, such as a pattern of ribs 25 on the front 27 wall, the rear wall 58, and the bottom wall 29 of the bin 24. These ribs can facilitate partitioning the interior of the bin 24 as disclosed in our earlier U.S. patent application Ser. No. 08/547,892, filed Oct. 25, 1995, now U.S. Pat. No. 5,685,467, which is incorporated herein by reference. Additionally one or more trays may be supported within the box as disclosed in our prior application.

Bedliners manufactured by the thermoforming process having distinctive appearances have been widely sold and have created a market for the appearance of particular designs. The integration of the utility box with the design of a particular bedliner is greatly facilitated if a utility box can be manufactured of a similar material by a process which allows a similar range to of shapes and patterns to be formed. The plastic blow molding process meets this requirement. But additional design features are necessary if the required functionality is to be achieved with a utility box formed of thermoplastic. This functionality is achieved by the selective incorporation of metal components in the design of the utility box 20.

The cargo bin has a peripheral lip 30 which defines an opening 26 of the cargo bin which is reinforced by a two part aluminum rim 32. The two part aluminum rim 32 is pop-riveted to the peripheral lip 30. The aluminum rim 32 provides stiffness and strength to the lip 30 which surrounds the opening 26. The aluminum rim 32 also provides engagement slots 34 for two locking hasps 36, 38. The engagement slots 34 are preferably punched in the aluminum extrusion forming the aluminum rim 32 so as to leave a small lip which extends downwardly into the bin where the hasps 36, 38 engage the aluminum rim 32. One of the locking hasps 36, has a key lock 40, and the other hasp 38 has a lock 41 slaved to the key lock 40 by a link rod 42. The aluminum rim 32 provides a rigid interface with the hasps 36, 38. The metal-to-metal contact provided by the slots 34 in the aluminum rim 32 provides reliable engagement of the hasps 36, 38 with the bin 24.

A tubular rubber gasket 44 is bonded to the inside 46 of the lid 22 and overlies the peripheral lip 30 forming a water resistant seal between the lid and the cargo bin. The gasket 44 is similar to a bicycle inner tube.

The lid 22 is joined to the bin 24 by three metal hinge pins 48, 50, 52. Each pin, as shown in FIG. 1, is inserted between annular plastic hinge pin retaining portions 45, 47 of the lid 22. Each pin is welded to a corresponding positioning bracket 53, 54, 55. The positioning brackets 53, 55 attach the hinge left pin 48, and right hinge pin 52, respectively, to the bin 24 and lock the lid 22 in position relative to the bin 24. The left and right hinge pins 48, 52 are joined by the brackets 53, 55 to sheet metal attachment plates 57, and 59. Portions of the plastic back wall 58, 65 are thus clamped between the brackets 53, 55 and the attachment plates 57, 59. The positioning brackets 53, 55 are thus mounted on the exterior 61 of the bin 24. The attachment plates 57, 59 are mounted interior to the bin 24 and provide a large surface which distributes the attachment loads of the screws 63 which attach the utility box 20 to the end of a truck bed. A hook such as shown in our earlier patent application referenced above may also be used to attach the utility box to the front walls of the bed of a truck.

As shown in FIG. 2, the middle hinge pin 50 extends from a metal positioning bracket 54 which is mounted on the bin exterior 61 and is connected to an interior bin-mounted lid support bracket 56 on the triangular flange 60 by bolts 68.

The bin-mounted lid support bracket 56 is a sheet metal part which has a planar flange 51 which extends generally parallel to the bin back wall 49 and which is connected to the back wall by screws.

The support bracket 56 has a triangular flange 60 which extends toward the bin interior from the planar flange 51. The triangular flange 60 is generally perpendicular to the wall mounted planar flange 51 and has a narrow stiffening flange 62 along the hypotenuse of the triangle, as well as a support flange 64 which extends approximately parallel to the wall mounted flange 51 and which is pop-riveted to the aluminum rim 32. An air spring 66 is joined to the apex 67 of the triangular flange 60 by a bolt 68 which passes through a hole 70 in the flange 60.

The air spring 66 has an extensible piston 72 and a cylinder 74. The cylinder 74 is joined to a sheet metal lid-mounted support bracket 76 by a bolt 78. The air spring 66 holds the lid 22 of the cargo bed utility box 20 open allowing ready access to the bin interior.

Plastic has great durability and is resistant to denting but, because of its relatively low yield strength, is subject to distortion if stresses are concentrated. To secure the advantages of a utility box constructed of plastic, namely: light weight, ornamentally pleasing shape, reasonable costs, and corrosion resistance with no requirement for painting; the design must provide for structures which prevent distortion of the utility box 20 by selectively reinforcing the plastic bin 24 and lid 22 with metal parts.

The hasps 36, 38 and the lid support spring 66 are possible sources of concentrated stresses. The hasps 36, 38 are engaged with slots 34 in the aluminum rim 32. The aluminum is relatively high strength and distributes the load imposed by the hasps 36, 38 over the peripheral lip of the bin 24.

The load imposed on the lid 22 and bin 24 by the air spring 66 is reduced by forming a continuous load path from where the air spring 66 is mounted to the lid-mounted bracket 76 to the bin-mounted bracket 56 by connecting both the lid bracket 76 and the bin bracket 56 to the steel hinge pin 50. At the same time the loads are partly resolved within the metal components 76, 56, 50, the loads imposed on the lid 22 and the bin 24 are distributed, thus avoiding stress concentrations and the resulting distortion.

The lid-mounted bracket 76 has a sheet metal strap 82 with a frontward depending triangular tab 80 to which the cylinder 74 of the air spring 66 is mounted. The sheet metal strap 82 is connected by screws to the underside 84 of the lid 22. Because the blow-molded lid has an underside which is spaced from its exterior surface, the screws are not exposed to the exterior. The strap 82 conforms to the contour of the underside 84 of the lid 22. The strap 82 also has a rearward extension 86 which has two outwardly extending ears 88. The ears 88 have holes 90 through which the hinge pin 50 passes. By mechanically joining the lid-mounted support bracket 76 and the bin mounted bracket 56 to the hinge pin 50, the plastic lid 22 and bin 24 are subject to less loading. In addition the decreased loads imposed on the lid 22 are distributed widely over the lid by the strap 82. The attachment of the bin-mounted bracket 56 by the support flange 64 to the aluminum rim 32 also distributes the loads from the air spring 66 over the peripheral lip 30.

It should be understood that where an air spring is disclosed, a conventional mechanical spring support could be used. It is also possible to replace the air spring with a mechanical linkage which will lock the lid open. A mechanical linkage will not assist in the opening of the lid but will preserve the functionality of supporting the lid.

It is understood that the invention is not limited to the particular construction and arrangement of parts herein illustrated and described, but embraces such modified forms thereof as come within the scope of the following claims.

We claim:

1. A storage container for use in the cargo bed of a pickup truck, comprising:

a plastic bin defining a storage compartment, having a front wall, a rear wall, a bottom wall, and two end walls, the bin including an upper lip defining an opening into the storage compartment;

a plastic lid which is positionable to selectably cover and reveal the opening and having an underside which faces the bin;

a first hinge pin connecting the lid and the bin and forming a hinge joint therebetween, to permit pivoting of the lid from a position covering the storage compartment opening to a position revealing the storage compartment opening;

a first bracket mounted to the bin rear wall and spaced between the two end walls, the first bracket having a portion through which the first hinge pin extends, the first bracket being constructed of sheet metal and having a planar flange which extends generally parallel to the bin rear wall and is affixed to the rear wall;

a second bracket mounted on the lid and positioned above the first bracket, the second bracket having a portion through which the first hinge pin extends, the second bracket having a sheet metal strap which engages the underside of the plastic lid; and a link for supporting the lid in an opened position relative to the bin, the link mounted between the first bracket and the second bracket.

2. The storage container of claim 1 wherein the spring is of the air piston type.

3. The storage container of claim 1 further comprising a strip of metal attached to the bin to surround the storage compartment opening and overlie the lip, and wherein the first bracket is mounted to the bin and fastened to the strip of metal to distribute the weight of the lid transmitted by the link to the strip of metal.

4. The storage container of claim 1 wherein the lid is connected to the bin by the first hinge pin and two additional hinge pins.

5. The storage container of claim 1 wherein the first hinge pin is rotatably mounted to the lid and fixedly attached to the bin.

6. The storage container of claim 1 wherein the lid is a double wall blow molded part and the bin is a single wall blow molded part.

7. The storage container of claim 1 further comprising a metal reinforced upper rim connected to the bin lip, and wherein the metal reinforced rim is fixed to the first bracket.

8. The storage container of claim 7 wherein the lid incorporates a lock with a hasp which is engaged with portions of the metal reinforced upper rim.

9. The storage container of claim 8 wherein portions of the metal rim define a slot, and wherein the hasp is extensible through the slot to engage the metal rim.

10. A storage container for use in the cargo bed of a pickup truck, comprising:

a plastic bin defining a storage compartment having a front wall, a rear wall, a bottom wall, and two end walls, the bin having upper portions defining an opening into the storage compartment, a plastic lid selectably covering the opening and connected to the bin by at least one hinge, the hinge including a first hinge pin joining the lid to the bin, the plastic lid having an underside which faces the plastic bin;

a first bracket mounted to the bin rear wall and spaced between the two end walls, the bracket having a portion through which the first hinge pin extends, the first bracket being constructed of sheet metal and having a planar flange which extends generally parallel to the bin rear wall;

a second bracket mounted on the lid and positioned above the first bracket, the second bracket having a portion through which the first hinge pin extends, the second bracket having a sheet metal strap which engages the underside of the plastic lid; and a link for supporting the lid in an opened position relative to the bin, the link mounted between the first bracket and the second bracket.

11. The storage container of claim 10 wherein the link is an air spring.

12. The storage container of claim 10 further comprising a metal rim which is connected to the bin to encircle the opening to the storage compartment, and wherein the first bracket is mounted to the bin and fastened to the metal rim to distribute the weight of the lid transmitted by the link to the metal rim.

13. The storage container of claim 10 wherein the lid is connected to the bin by the first hinge pin and two additional hinge pins.

14. The storage container of claim 10 wherein the first hinge pin is rotatably mounted to the lid and fixedly attach to the bin.

15. The storage container of claim 10 wherein the lid a double wall blow-molded part and the bin is a single wall blow-molded part.

16. The storage container of claim 10 wherein the bin portions defining the opening to the storage chamber comprise an inwardly extending plastic lip, and wherein a metal rim is fastened to the plastic lip, and wherein the first bracket is fixed to the metal rim.

17. The storage container of claim 16 wherein the lid has a lock with a hasp which engages with portions of the metal rim.

18. The storage container of claim 17 wherein portions of the metal rim define a slot and wherein the hasp is extensible through the slot to engage the metal rim.

* * * * *